United States Patent [19]

De Martelaere

[11] 4,118,851

[45] Oct. 10, 1978

[54] UNIVERSAL PISTON PIN REMOVER AND INSTALLER

[76] Inventor: David L. De Martelaere, 4176 Ramblewood, Troy, Mich. 48089

[21] Appl. No.: 813,540

[22] Filed: Jul. 7, 1977

[51] Int. Cl.[2] .............................................. B23Q 1/00

[52] U.S. Cl. ...................................................... 29/283

[58] Field of Search ........................ 29/251, 252, 283; 33/180 B, 164 C; 100/257

[56] References Cited

U.S. PATENT DOCUMENTS

| | | | |
|---|---|---|---|
| 1,841,190 | 1/1932 | Justiss | 29/263 |
| 2,891,302 | 6/1959 | Fuglie et al. | 29/251 |
| 3,031,744 | 5/1962 | Stein | 29/283 |
| 4,050,139 | 9/1977 | Okamuro | 29/283 |

FOREIGN PATENT DOCUMENTS

| | | | |
|---|---|---|---|
| 922,320 | 2/1947 | France | 29/256 |

*Primary Examiner*—James L. Jones, Jr.
*Attorney, Agent, or Firm*—Burton, Parker & Schramm

[57] ABSTRACT

Relates to tools or fixtures for removing press fit piston pins from automobile engine pistons for repair or replacement and for installing repaired or new pins in pistons. More specifically, the invention accomplishes these operations without imposing any load on the piston, thus eliminating the possibility of deforming or otherwise damaging the softer piston. To this end, one of the supporting structures of the tool is shaped in a special way to be received within the skirt of the piston and underlay the smaller end of the connecting rod thereby to receive the driving forces applied to advance a piston pin through the bore of the connecting rod for the purpose of either removing the pin or installing the repaired pin or its replacement. Other features of the invention have to do with the provisions associated with the same tooling device for centering an installed piston pin in the bore of the connecting rod and for employing the same part of a support block for performing the steps of both removing and installing piston pins in the aligned bores of the piston and connecting rod assemblies. A micrometer type adjustment provision forms part of the piston pin driver assembly and cooperates therewith to automatically stop further advancement of the piston pin when it attains a centered position in the connecting rod.

7 Claims, 6 Drawing Figures

40
38
14
30
44
44

58
60
82
80
78
A C E G I K M O
B D F H J L N 66
56
64
62
58
60
80
50
52
68
38
40
10
54
18
16
22
20
32
36
14
34
74
24
26
72
76
70
44
-46-
48

UNIVERSAL PISTON PIN REMOVER AND INSTALLER

CROSS REFERENCE TO RELATED APPLICATION

The present application is directed to certain improvements in tools or fixtures of the kind disclosed and claimed in the co-pending application for patent filed in the name of Peter F. Schneider, Ser. No. 803,155 filed June 3, 1977, and of common ownership herewith.

BACKGROUND OF THE INVENTION

This invention relates to devices or fixtures for holding automotive engine parts while work is performed thereon and more particularly to piston and connecting rod assemblies for the removal and installation of piston pins.

It has been the prior practice to strongly clamp or otherwise subject the pistons to considerable pressures while the piston pins were removed therefrom or installed therein. Such practice resulted in deformed pistons or damage to the bores in the pistons through which the piston pins were forced. Piston pins, also referred to as the wrist pins, have been generally made of hollow case-hardened steel members, whereas the pistons were made of softer metal, usually an aluminum alloy, and were frequently damaged by improperly forced piston pins. In addition, during this operation the pistons were subjected to strong clamping pressures as their wrist pins were either forced into or out of the bores of the pistons and connecting rods, and a great deal of care had to be exercised in order to avoid damage to these parts. It is apparent from the foregoing description that there has been a need for an improved tool or fixture for removing and installing piston pins in pistons and connecting rods of automobile engines.

SUMMARY OF THE INVENTION

A tool device constructed in accordance with the present invention eliminates the need for subjecting the piston to holding or clamping pressures while undergoing the removal or installation of a wrist pin. Such a device also has provision for enabling the wrist pin to be automatically centrally fitted within the bores of the connecting rod and piston and the further provision for adjustment of the tool to accommodate different sizes of wrist pins.

It is therefore an important object of the invention to provide improved means for holding an assembly of an automotive piston and a connecting rod while undergoing the removal or installation of a wrist pin.

Another important object of the invention is to provide an improved mounting arrangement which, in the performance of removing and installing wrist pins, transfers the forces heretofore endured by the piston with resulting damage thereto to the stronger connecting rod and the mounting support therefor.

Another important object of the invention is to provide, in a piston pin removing and installing device of the character set forth, a novel and improved manner of automatically centering the installed wrist pin within the bores of the piston and connecting rod, the novel centering provision being adjustable to accommodate different sizes of wrist pins.

A further important object of the invention is to provide a tool or fixture for the removal and replacement of wrist pins which is practically universal in its ability to handle all sizes and makes of such pins commonly used in the automobile industry.

In carrying out these and other objects of the invention, a tool or fixture is contemplated which is designed to remove piston pins from conventional piston and connecting rod assemblies for repair or replacement thereof and to install the repaired or replaced pin into the piston and connecting rod assembly in a manner transfering the holding or clamping pressures heretofore applied against the softer piston to the stronger connecting rod and its support. This is accomplished by a novel and improved manner of supporting the connecting rod within the skirt of the piston so that all of the forces applied to remove or install the wrist pin are borne by the connecting rod and its support. For this purpose, the support plate for the connecting rod is bifurcatingly shaped at one end to enter the piston's skirt and to straddle the wrist pin bores of the piston and connecting rod. The forked end is thinned down to underlay the boss of the connecting rod into which the piston pin is received. The balance of the support for the connecting rod is buttressed with thickened portions located for the most part outside of the piston's skirt and of a structural design to withstand the power applied forces exerted to drive the wrist pin through the aligned bores of the piston and connecting rod.

To enable the tool or fixture to be used with piston pins of different sizes, the device is provided with an adjustable gauge which, depending on its setting, will automatically restrict further movement of the piston pin through the bores of the piston and connecting rod when the piston pin is longitudinally centered with respect to these bores. Such an adjustment feature preferably takes the form of a micrometer type gauge forming part of the piston pin driver assembly and located in the upper more visible area of the device. The micrometer gauge includes a pair of circularly shaped, co-axially aligned members, one of which is threaded on the other for both rotatable and axial displacement relative to one another. The two co-axial members bear legends defining varied settings to which the members may be adjusted relative to one another to limit the advancement of the piston pin driver and thus stop the advancement of the piston pin being installed in correctly centered position with respect to the piston pin bores of the piston and connecting rod.

A feature of the present invention is the provision for guiding the operating elements and the piston pin from above the tool and takes the form of an arch overlying the forked end of the connecting rod support plate which is provided with a vertical bore for guiding piston pin removing and installing operating elements. Additionally, the arch cooperates with the micrometer gauge and serves as a stop limiting further advance of the installing arbor and piston pin driven thereby.

BRIEF DESCRIPTION OF THE DRAWING

Various other objects, advantages and meritorious features of the invention will become more fully apparent from the following specification, appended claims and accompanying drawing sheets, wherein:

DESCRIPTION OF A PREFERRED EMBODIMENT

Figure 1:
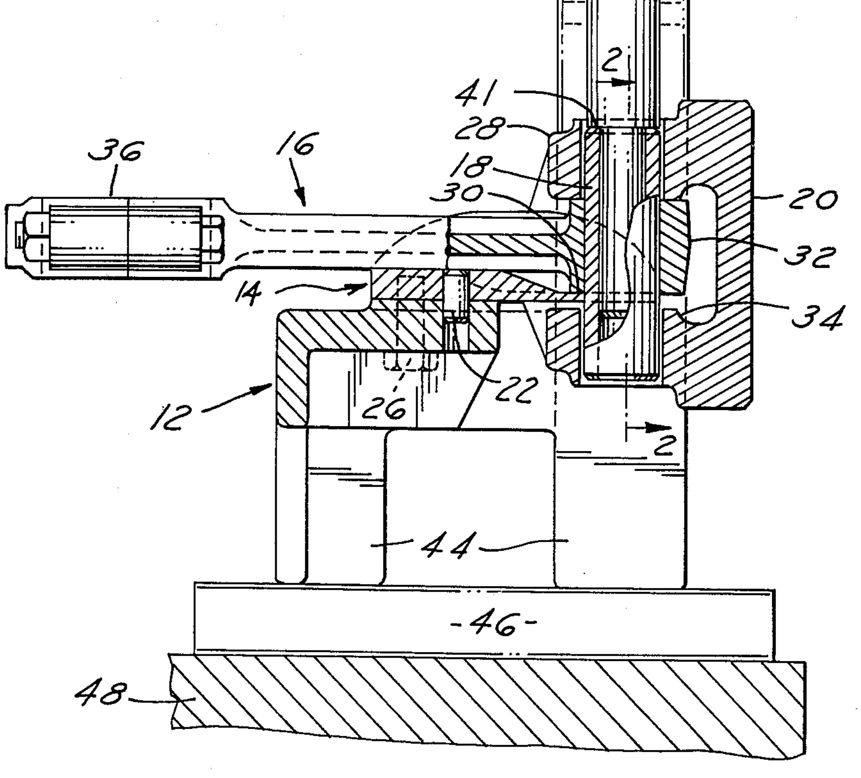
FIG. 1 is a side elevation, partly in section, of a tool or fixture showing the arrangement of its parts for removing a piston pin from an assembly of a piston and connecting rod.
Figures 4, 5, 6:
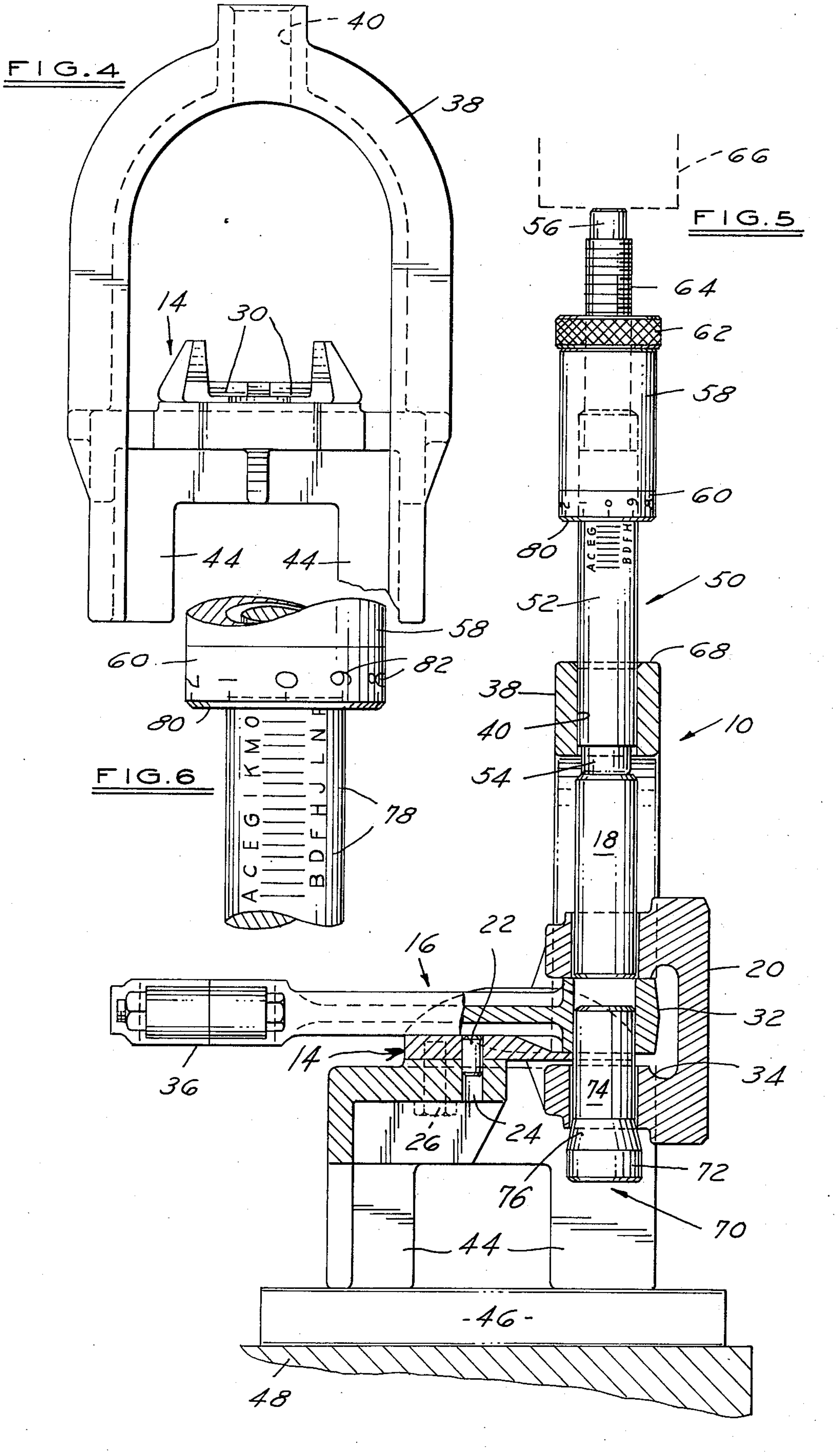
FIG. 4 is front elevation of the tool or fixture of FIG. 1, but without the presence of a piston and connecting rod assembly mounted thereon.
FIG. 5 is a view, similar to FIG. 1, but showing the use of the tooling device for installing a piston pin into the assembly of a piston and connecting rod including the use of additional accessory tool elements for guiding and centering a piston pin in the course of its installment in the assembly.
FIG. 6 is an enlarged fragmentary view of a micrometer type adjuster associated with the tool for setting the piston pin driver for automatically centering the piston pin as it is installed in the connecting rod.

In general, the same parts of the tool or fixture used for removing piston pins are also used for installing either a repaired pin or a replacement for the removed pin. Referring initially to FIGS. 1 and 5, which respectively show the parts of the tool 10 for removing and installing piston pins, the base structure of the tool is identified at 12 and surmounting the base and removably attached thereto is a support block or plate 14 which underlies approximately half of the length of a connecting rod 16 whose piston pin 18 is being removed (FIG. 1) or installed (FIG. 5). A comparison of FIGS. 1 and 5 will show that with respect to the two Figures the connecting rod 16 and its piston 20 have remained on the fixture where they were initially mounted and will further show that in the case of FIG. 5 a few additional operating elements have been added to the basic fixture disclosed in FIGS. 1 and 5.

The support block or plate 14 is preferably a separate element from the base 12 in order that different materials may be used for their respective bodies. Base 12 may be made of a casting of ductile or malleable iron whereas the support block 14 is preferably made of stronger material such as tool steel. As later described herein, the tougher and more expensively made support block 14 is subjected to relatively strong pressures, and its association with a larger cast iron base 12 is less costly than a single block of tool steel for both the base 12 and support block 14. The support block or plate 14 is removably secured in proper position by two pairs of spaced apart elements, a pair of depending stud or dowel pins 22 on block 14 which slidably fit a pair of holes 24 in the base 12 and a pair of screws 26 which rise from the base for threaded engagement in the block 14.

Figure 3:
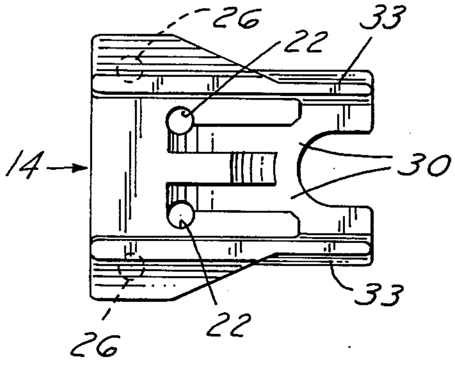
FIG. 3 is a top plan view of the support block for the connecting rod.
Figure 2:
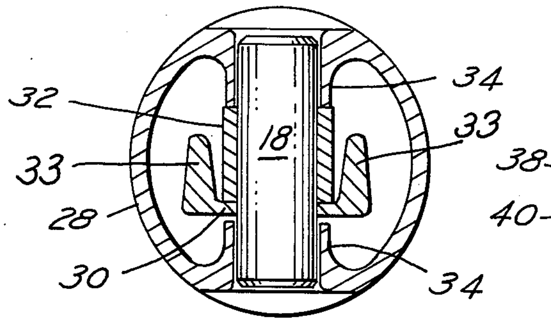
FIG. 2 is a vertical sectional view taken along line 2—2 of FIG. 1 and showing the configuration of the support block and adjacent parts of the connecting rod in its load supporting position and the piston in unsupported relation thereto.

The right end portion of the support block or plate 14, as viewed in FIG. 3, is constructed and dimensioned for entry within the opened end of the skirt 28 of the piston 20. When properly introduced into the piston skirt, the block provides a semi-circular supporting rest or seat 30 for the boss 32 of the connecting rod 16 through which the piston pin 18 normally extends. To accomplish this support arrangement for the boss 32 of the connecting rod, the right end portion of the support block 14, as viewed in FIG. 3, is bifurcated and semi-circularly recessed in the manner shown to form a forked extremity having a pair of spaced parallel arms 33—33 on opposite sides of the semi-circular seat 30. The supporting seat 30 extends as a border around the recess and assumes a radius of curvature approximately corresponding to that of the bore of the connecting rod boss 32. Preferably, as shown in FIG. 4, the seat 30 is reduced in thickness as compared with the surrounding material of the support plate as is evident in FIG. 4 in order to form the thin, approximately semi-circular seat or lip 30 which intervenes between the boss 32 of the connecting rod and the lower one of a pair of aligned ring-shaped protuberances 34—34 (see FIG. 2) on the inside of the skirt of the piston in which the piston pin is received. So mounted, the piston 20 is maintained out-of-contact with all parts of the tool so that all forces applied, either during removal or installation of the piston's wrist pin, are borne by the stronger connecting rod 16 and its support plate 14.

When the tool or fixture is used to remove a piston pin, the right end portion of the support plate 14, as viewed in FIG. 3, is employed to enter the piston skirt 28 and underlay the connecting rod boss 32 to support the same in the manner previously described herein. The opposite or left end portion of the support plate 14 is thickened substantially as at 33 (FIGS. 2 and 3) compared with the right end portion to strengthen its resistances to the strong forces applied to drive the piston pin out of the connecting rod boss 32 or to install a repaired piston pin or a replacement therefor. Under either working condition, the horizontal extent of the supporting plate 14, although underlying only the right end half of the connecting rod 16, is sufficient to support the crankshaft engaging end 36 of the connecting rod in free space as illustrated in FIGS. 1 and 5.

For removing a wrist pin 18 from a piston and connecting rod assembly, a particular tool element 37, herein referred to as a removal arbor, is shown in FIG. 1 as extending upwardly from the wrist pin 18 located in the piston 20 and connecting rod boss 32 and through a structural component in the form of an arch 38 which overlies the forked end of the support plate 14 as shown in FIG. 4. At the midportion of the arch it is shaped with a bore 40 in which the removal arbor has a sliding fit. The arbor 37 is preferably of one piece but provided with a reduced lower end section which enters the wrist pin 18 to be removed and forms a shoulder 41 at the juncture with the larger section which will abut the ends of commonly used wrist pins in the manner shown in FIG. 1. When forced downwardly such as by a power press or ram 42 of sufficient force, it will drive the wrist pin through the bore of the piston, in which it has a slip fit, and through the bore of the connecting rod, in which it has a press fit. As for the load limit to be applied to the illustrated embodiment of the invention, this should not exceed 5,000 pounds of force for either removing or installing a wrist pin. When pressed out of the connecting rod 16, the wrist pin 18 will fall between the legs 44 of the fixture and the spacer blocks 46, the latter having such a height above the face plate 48 as to allow the extracted wrist pin to clear the skirt 28 of the piston 20 just before it touches down on the face plate.

The axis of the bore 40 of the arch 38 should coincide with the axis of the semi-circular seat 30 of the support plate 14. To this end the fastening elements of the plate 14, such as the studs 22 in the form of hardened ground dowel pins and the head cap screws 26, are precisely located with respect to the axis of the arcuate seat 30 of the plate.

For installing a wrist pin 18 in a piston and connecting rod assembly, a different form of arbor member is utilized which cooperates with the arch 38 in a novel manner for automatically locating the wrist pin in centered position within the connecting rod and piston. The installing arbor, which is generally indicated at 50, includes a long central member 52 which is reduced at its opposite ends to form short sections 54 and 56. The reduced lower end section 54 is of a size to abut the ends of hollow wrist pins, such as indicated at 18 in FIG. 5, and force such wrist pins through the aligned bores of the piston and connecting rod. Surrounding the upper portion of the central member 52 of the installing arbor 50 are two rotatably adjustable members, a barrel member 58 carrying a thin sleeve 60 bearing an encircling set of indicia and a lock nut ring 62 having a knurled exterior surface. Both the barrel 58 and the lock nut 62 are internally helically threaded for threaded engagement with external helical threads 64 on the central member 52, a portion of which are exposed at the upper end thereof in FIG. 5. Rotation of the barrel member 58 will cause the barrel to travel up or down on the central member 52 depending on the direction of rotation. A similar action applies to the lock nut except when it abuts the barrel member 58, and is tightened thereagainst, it will releasably lock the barrel against rotation. As in the case of the removal arbor 37, the same or a different power press or ram 66 can act on the upper end of the installing arbor 50 to depress the arbor and wrist pin into the bores of the piston and connecting rod. It is apparent that in the course of the arbor's downward movement that the barrel member 58 will strike the upper edge 68 of the arch 38 thereby terminating further downward movement of the arbor and wrist pin. It is also apparent that rotational adjustment of the barrel will vary its position on the arbor and thus vary the depth that the wrist pin is lowered in the bores of the piston and connecting rod.

Another installing tool element is provided for guiding the piston pin as it is pressed downwardly through the bores of the piston and connecting rod. It is hereinafter referred to as a piston or wrist pin guide and identified by the general reference character 70 near the bottom of FIG. 5. A set of such pin guides is supplied with each tool or support fixture and each pin guide in the set has a distinct diameter size differing from all others in the set. The pin guides in the set may be color-coded to help distinguish certain groupings of such pins fron one another. Each pin guide is a three-sectioned generally cylindrical body and made of soft metal, such as aluminum. The two end sections 72 and 74 are cylindrical but of different diameters and the middle section 76 is conical. When the proper size of pin guide is selected for a given wrist pin size, its smallest diameter section, which is also its longest section, will pass through the lower bore of the piston and part way into the bore of the connecting rod. Thereafter, in order to self-retain the pin guide in the position shown in FIG. 5, it may be hand tapped slightly further into the piston and such that the conical section 76 may be wedged in the mouth of the piston bore. In addition to releasably retaining the pin guide in the connecting rod, this action will also center the connecting rod in the piston. At this time the wrist pin may be dropped into the other upper end of the bore in the piston. When the piston, connecting rod, wrist pin and pin guide are properly positioned on the fork of the support plate 14, the pin guide 70 will also center this assembly in the tool. If a pin guide 70 is selected for centering which is too small, the piston and connecting rod assembly is not likely to be located centrally in the tool and damage may consequently occur to the fork of the tool.

FIG. 6 illustrates in detail that previously mentioned feature of the tool for automatically stopping the advancement of the wrist pin 18 in correctly centered position for that size of pin in the bores of the piston and connecting rod. This result is obtained by incorporating a micrometer type gauge into the wrist pin driver assembly and utilizing a stationary part of the base structure 12 as a stop for the installing arbor of the driver assembly and consequently discontinuing the travel of the wrist pin as it reaches its centered position. The central member or shaft 52 of the wrist pin driver assembly bears markings 78 spaced equal distances longitudinally therealong. In the course of its threaded rotational movement along the central shaft 52, the barrel 58 will either progressively expose or conceal the markings 78 appearing visible to the eye. This enables the lower edge 80 of the band or collar 60 to be utilized as a reference for reading the alphabetical scale 78. The markings 82 carried by the thin circular band 60 fixed on the barrel 58 are shown as numerical. The alphabetical and numerical markings on the shaft 52 and the barrel 58, respectively, could be reversed or other symbols substituted therefor. In any event the alphabetical and numerical characters can be combined to represent the settings of different makes of automobiles and their respective wrist pin sizes. Sample settings for different makes of motor vehicles are: (1) I-7 for a wrist pin size of 0.927 inches, (2) E-5 for a wrist pin size of 0.980 inches, and (3) E-2 for a wrist pin size of 1.000 inches. A chart of such settings would accompany the tool.

With knowledge of the size of the wrist pin to be installed, the proper length of travel of the installing arbor 50 is adjusted by turning the numbered barrel or sleeve 58 on the lettered shaft 52 until the specified alphanumeric setting from the chart is obtained. That is to say, the barrel is rotatably adjusted until its lower edge 80 aligns with the line designated by the letter shown on the chart and then the barrel is slightly rotated a fraction of a full turn to bring the number shown on the chart into the zero position illustrated in FIG. 6. Following this setting step, the knurled nut is turned on the shaft 52 to engage and lock the numbered sleeve or barrel 58 on the shaft. The installing arbor assembly 50 is thereby locked in adjusted position for automatically centering the wrist pin in the piston and connecting rod. The locked installing arbor 50 is inserted in the hole or bore 40 of the arch 38 to assume the position shown in FIG. 5. Thereafter the press or ram 66 exerts downward force on the central shaft 52 of the installing arbor to depress the shaft and wrist pin until the barrel 58 contacts the rim 68 surrounding the hole 40 formed in the top of the arch 38 and is stopped from further downward movement even though the press 66 continues to apply pressure to do so. At this time in the installing operation, the pin guide 70 will fall out of the connecting rod and out of the lower piston bore as the wrist pin is pressed into the bore of the connecting rod and stops at its centered position therein.

While a particular embodiment of the invention has been described and illustrated, it will be understood, of course, that it is not desired that the invention be limited thereto since additional modifications may be made. It is, therefore, contemplated by the appended claims to cover any such modifications as fall within the true spirit and scope of the invention.

What is claimed is:

1. An automotive engine fixture for removing and installing piston pins including, in combination:

a support structure having a mounting surface shaped to receive and support a connecting rod and piston assembly of an automobile engine from or into which the piston pin is to be removed or installed respectively;

a piston pin driver member for advancing the piston pin in the bores of the piston and the connecting rod;

said support structure having a part thereof exhibiting an arched formation and provided with a vertical bore therethrough for slidably guiding the piston pin driver member in its advancements of the piston pin in the bores of the piston and connecting rod; and a presetting device for controlling the extent of movement of the piston pin as advanced by the driver member including a sleeve carried by the driver member which is longitudinally adjustable therealong and is oversize the vertical bore of the arched part; the upper rim of the vertical bore forming an abuttable stop against which the sleeve abuts and stops further advance of the driver member and piston pin; and said sleeve and said driver member having cooperating graduations marked thereon for signifying different settings of the sleeve to stop each size of piston pin at its centered position within the bores of the connecting rod and piston.

2. An automotive engine fixture for removing and installing piston pins including, in combination:

a support structure having a mounting surface shaped to receive and support a connecting rod and piston assembly of an automobile engine from or into which the piston pin is to be removed or installed respectively;

a piston pin driver member for advancing the piston pin in the bores of the piston and the connecting rod;

said support structure having a part thereof exhibiting an arched formation and provided with a vertical bore therethrough for slidably guiding the piston pin driver member in its advancements of the piston pin in the bores of the piston and connecting rod; and adjustable means cooperatively associated with the piston pin driver member and with the arched part of the support structure for stopping the advancement of the driver member when the piston pin assumes its centered position within the bore of the connecting rod.

3. An automotive engine fixture of the character defined in claim 2 wherein said adjustable means is in the form of a micrometer having a sleeve axially adjustable with respect to the driver member and cooperating therewith for indicating setable positions of the micrometer.

4. An automotive engine tool of the character defined in claim 3 wherein means is provided for releasably locking the sleeve in set condition.

5. An automotive engine tool for installing piston pins including, in combination:

a support structure having a mounting surface shaped to receive and support a connecting rod and piston assembly of an automobile engine into which the piston pin is to be installed, said support structure having a part extending spacedly above the mounting surface and having a vertical bore therein whose axis is substantially coincident with the bore axes of the connecting rod and piston when properly supported by the mounting surface;

a piston pin driver member guided in said vertical bore of said part for advancing a piston pin in the bores of the piston and connecting rod assembly while the latter is supported by said mounting surface; and means carried by the piston pin driver member including a sleeve encircling the driver member which is oversize the bore of said part of the support structure and which is axially movable along the driver member for varying the distance of movement of the driver member before the oversize sleeve abuts the rim of the bore of said part and stops further advancement of the piston pin by the driver member, said sleeve and said driver member having cooperating graduations marked thereon for signifying different settings of the sleeve to stop each size of piston pin at its centered position within the bores of the connecting rod and piston.

6. An automotive engine tool for installing piston pins including, in combination:

a support structure having a mounting surface shaped to receive and support a connecting rod and piston assembly of an automobile engine into which the piston pin is to be installed;

a piston pin driver member for advancing the piston pin in the bores of the piston and connecting rod assembly while the latter is supported by said mounting surface;

adjustable means for varying the extent of advancement of the piston pin by the driver member and being setable in various positions for automatically stopping further advancement of the piston pin by the driver member when the piston pin has been advanced to its centered position in the bore of the connecting rod;

said adjustable means taking the form of a sleeve with graduations associated therewith which is so threadedly engaged with the piston pin driver member that the sleeve advances or retracts along the axis of the driver member depending on the direction of rotation of the sleeve; and a stop located alongside of the path of travel of the driver member for abuttable engagement by the adjustable sleeve which when such engagement occurs discontinues further advancement of the driver member and piston pin in accordance with the setting of the markings associated with the adjustable sleeve.

7. An automotive engine tool for installing piston pins including, in combination:

a support structure having a mounting surface shaped to receive and support a connecting rod and piston assembly of an automobile engine into which the piston pin is to be installed;

a piston pin driver member for advancing the piston pin in the bores of the piston and connecting rod assembly while the latter is supported by said mounting surface;

adjustable means for varying the extent of advancement of the piston pin by the driver member and being setable in various positions for automatically stopping further advancement of the piston pin by the driver member when the piston pin has been advanced to its centered position in the bore of the connecting rod;

said adjustable means taking the form of a micrometer gauge including a threadedly engaged part which when relatively rotated either advances or retracts along an axis paralleling the path of travel of the piston pin driver member; and a surface area of the support structure forming a stop abuttably engagable by said part of the micrometer gauge and acting to limit further travel of the driver member and the piston pin driver thereby in accordance with the setting of the threadedly engaged part.

* * * * *